(12) United States Patent
Beasley et al.

(10) Patent No.: US 8,762,950 B2
(45) Date of Patent: Jun. 24, 2014

(54) SOFTWARE TOOL FOR SCENARIO-BASED CODE INSPECTIONS

(75) Inventors: Dennis B. Beasley, Oswego, IL (US); Wayne A. Booth, Warrenville, IL (US); Stephen M. Kennedy, Columbus, OH (US); Mark D. Tischler, Wheaton, IL (US); David Walter Vollman, Naperville, IL (US)

(73) Assignee: Alcatel Lucent, Paris (FR)

( * ) Notice: Subject to any disclaimer, the term of this patent is extended or adjusted under 35 U.S.C. 154(b) by 1016 days.

(21) Appl. No.: 12/178,745

(22) Filed: Jul. 24, 2008

(65) Prior Publication Data

US 2010/0023930 A1 Jan. 28, 2010

(51) Int. Cl.
*G06F 9/44* (2006.01)

(52) U.S. Cl.
USPC ............................ 717/126; 717/124; 717/125

(58) Field of Classification Search
None
See application file for complete search history.

(56) References Cited

U.S. PATENT DOCUMENTS

| | | | | |
|---|---|---|---|---|
| 5,652,899 A * | 7/1997 | Mays et al. | | 715/239 |
| 6,253,370 B1 * | 6/2001 | Abadi et al. | | 717/154 |
| 6,275,223 B1 * | 8/2001 | Hughes | | 715/751 |
| 6,493,868 B1 * | 12/2002 | DaSilva et al. | | 717/105 |
| 6,871,340 B1 | 3/2005 | Gillis | | |
| 7,395,525 B2 * | 7/2008 | Softky | | 717/125 |
| 7,904,802 B1 * | 3/2011 | Kolawa et al. | | 715/230 |
| 2003/0145282 A1 * | 7/2003 | Thomas et al. | | 715/513 |
| 2006/0277531 A1 * | 12/2006 | Horwitz et al. | | 717/137 |
| 2007/0044075 A1 * | 2/2007 | Koning et al. | | 717/122 |
| 2008/0098344 A1 * | 4/2008 | Piatt | | 717/101 |
| 2008/0178155 A1 * | 7/2008 | Gogh et al. | | 717/125 |
| 2008/0189681 A1 * | 8/2008 | Bhogal et al. | | 717/106 |
| 2008/0295085 A1 * | 11/2008 | Rachamadugu et al. | | 717/159 |
| 2009/0070747 A1 * | 3/2009 | White | | 717/129 |

OTHER PUBLICATIONS

Eisenbarth, Thomas, et al., Locating Features in Source Code, IEEE Transactions on Software Engineering, vol. 29, No. 3, Mar. 2003.
Bojic, Dragan, et al., Addendum to "Locating Features Source Code," IEEE Transactions on Software Engineering, vol. 30, No. 2, Feb. 2004.
Stein, Michael, et al., A Case Study of Distributed, Asynchronous Software Inspection, ACM, Inc., ISCE 97 Boston MA, Copyright 1997.
Shull Forrest, et al., Improving Software Inspections by Using Reading Techniques, Proceedings of the 23$^{rd}$ International Conference on Software Engineering (ICSE'01).
Basili, Victor R., Evolving and Packaging Reading Technologies, J. Systems Software 1997; 38:3-12, Copyright 1997 by Elsevier Science, Inc.

(Continued)

*Primary Examiner* — Isaac Tecklu
(74) *Attorney, Agent, or Firm* — Fay Sharpe LLP

(57) ABSTRACT

A computer program product for scenario-based source code inspection is provided. The computer program product comprises a computer-usable data carrier storing instructions that, when executed by a computer, cause the computer to display a plurality of functions, the plurality of functions comprising: a first function for creating one or more scenario paths in the source code by providing the ability to create hyperlinks from subroutine/macro calls to the subroutine or macro source in the code and commentary addition; and a second function for inspecting code in execution order and inspecting uninspected lines of code by providing the ability to annotate the code with any errors and observations found and mark lines inspected.

17 Claims, 5 Drawing Sheets

(56) References Cited

OTHER PUBLICATIONS

Thelin, Thomas, et al., An Experimental Comparison of Usage-Based and Checklist-Based Reading, IEEE Transactions on Software Engineering, vol. 29, No. 8, Aug. 2003.

Johnson, Philip M., et al., Improving Software Quality through Computer Supported Collaborative Review, revised version of a paper appearing in Prodeedings of the Third European Conference on Computer Supported Cooperative Work, Milan, Italy, Sep. 1993.

Jeffrey, Ross, et al., Has Twenty-five Years of Empirical Software Engineering Made a Difference?, Proceedings of the Ninth Asia-Pacific Software Engineering Conference (APSEC'02), Copyright 2002 IEEE.

Murphy, Paul, et al., A Process for Asynchronous Software Inspection, pp. 96-104, Copyright 1997 IEEE.

Johnson, Philip M., et al., Assessing Software Review Meetings; A Controlled Experimental Study Using CSRS, ICSE 97 Boston, MA, Copyright 1997.

Boehm, Barry, et al., Software Defect Reduction Top 10 List, Software Management, pp. 135-137, Jan. 2001.

Basili, Victor, R., Evolving and Packaging Reading Technologies, J. Systems Software 1997; 38:3-12, Copyright 1997 by Elsevier Science, Inc., NY.

Mellis, David Al., Understanding Code, Interaction Design, Institute Ivrea, Draft: Apr. 11, 2006.

\* cited by examiner

SOFTWARE TOOL FOR SCENARIO-BASED CODE INSPECTIONS

BACKGROUND OF THE INVENTION

This invention relates to software development and, more particularly, to a software inspection tool for scenario-based code inspections.

By way of background, a very time consuming part of software development is the process known as code inspection. In this process, the developer who has written some new code or changed some existing code calls a meeting of knowledgeable, interested parties to review the developer's work and to look for potential issues.

Code inspection collaboration tools have been developed by research teams (e.g., University of Hawaii's Jupiter product) and by companies (e.g., SmartBear Software's CodeCollaborator). These tools provide capabilities for sharing source code and comments to generally support a full top-down sequential reading code inspection process. In this process source files are read through line-by-line from top to bottom only once, examining all possible execution paths at the same time.

On the other hand, scenario-based reading techniques involve examining specific execution paths while examining the code. Thus, to support scenario-based reading techniques, it may be necessary to read through a function or section of code multiple times in order to investigate different paths though the code. It will also be necessary to keep track of what has been inspected and to examine the impact of referential code not included in any simple code differencing output.

The usage of scenario-based reading for code inspections presents several problems that are not solved by existing solutions. One is the need for marking lines inspected. When reading source code using a top-down sequential approach the path through the source code files is largely linear and keeping track of which lines have been inspected is relatively simple. When scenario-based reading techniques are used, code segments may be read multiple times, only reading certain subsets of the instructions on each pass through the code segment. A technique to keep track of what has been inspected is required.

Scenario-based reading also requires a tool to aid in finding source code that requires inspection but has not yet been inspected. In traditional code inspection reading techniques this is not required as files are typically processed linearly. With scenario-based reading many code paths are followed. Scenario-based inspections typically strive for 80% code coverage through the use of specific scenarios, and then rely on more traditional approaches to review lines missed by the specific scenarios. There is a need for a tool that provides an indication to the reviewer whether all lines to be inspected have been inspected, and, if not, the tool must provide direction to the places in the code that have not been inspected.

Existing code inspection tools support either full source code inspections, inspections of only changed source code, or both types. With scenario-based reading techniques, code inspections often require reading selected elements of unchanged code (or referential code) along with changed code. Tool support is needed to support generating inspection packages containing changed code plus selected code segments of referential code. For source languages that often separate definitions from declarations, these definition files are also useful in performing inspections when possibly only the declaration files were changed.

The present invention contemplates a new and improved code inspection tool that resolves the above-referenced difficulties and others.

SUMMARY OF THE INVENTION

In accordance with an aspect of the present invention, a computer program product for scenario-based source code inspection is provided. The computer program product comprises a computer-usable data carrier storing instructions that, when executed by a computer, cause the computer to display a plurality of functions, the plurality of functions comprising: a first function for creating one or more scenario paths in the source code by providing the ability to create hyperlinks from subroutine/macro calls to the subroutine or macro source in the code and commentary addition; and a second function for inspecting code in execution order and inspecting uninspected lines of code by providing the ability to annotate the code with any errors and observations found and mark lines inspected.

In accordance with another aspect of the present invention, a system for scenario-based source code inspection is provided. The system comprises: an input device; a display device in communication with the input device; a user processing device in communication with the display device; and a program storage medium for storing the source code and the source code inspection tool, wherein the source code and the source code inspection tool are displayed on the display device and the software inspection tool comprises a plurality of functions. Further, the plurality of functions comprises: a first function for creating one or more scenario paths in the source code by providing the ability to create hyperlinks from subroutine/macro calls to the subroutine or macro source in the code and commentary addition; and a second function for inspecting code in execution order and inspecting uninspected lines of code by providing the ability to annotate the code with any errors and observations found and mark lines inspected.

In accordance with yet another aspect of the present invention, a method is provided. The method comprises: creating one or more scenarios in source code that are to be inspected by one or more reviewers; reviewing each of the scenarios by reading text and following the hyperlinks; marking lines of source code inspected with a software tool; determining whether all lines of code to be inspected have been inspected; and recording an inspection disposition when all lines of code to be inspected have been inspected.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 is a sample screen shot showing an example of a context menu in accordance with aspects of the present invention;

FIG. 4 is a sample screen shot showing an example of a context menu with an edit/delete hyperlink feature in accordance with aspects of the present invention;

FIG. 5 is a sample screen shot showing an example of lines marked inspected in accordance with aspects of the present invention; and FIG. 6 is a sample screen shot of one example of an Inspection Disposition page in accordance with aspects of the present invention.

DETAILED DESCRIPTION

Figure 1:
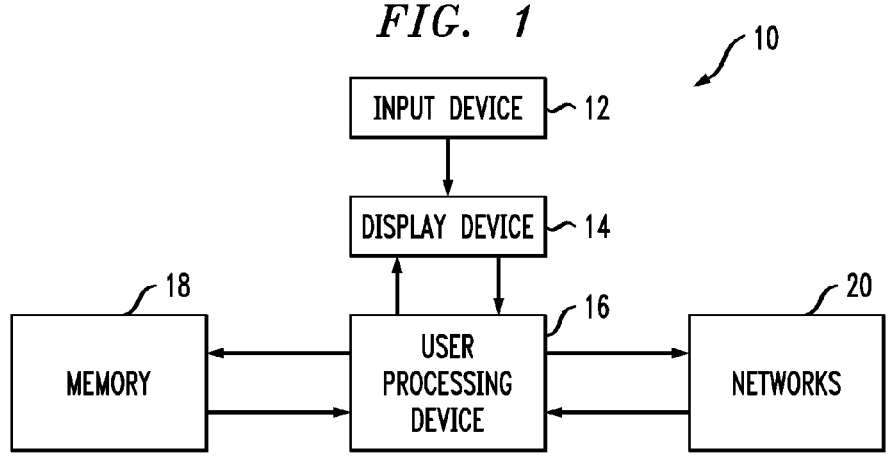
FIG. 1 illustrates a hardware diagram suitable for implementing aspects of the present invention.

The present invention is directed to a new feature in a software tool for code inspections. This new feature provides support for scenario-based code inspections. As used herein, the term "code inspection" refers to human examination of source code for the purpose of finding defects and violations of coding standards. One aspect of the software tool is that it permits reviewers to mark lines with relevant notations. This feature is helpful for use with scenario-based reading techniques. Scenario reading for code inspections involves following "execution paths" through the code in order to find defects. This scenario reading technique is similar to what the computer executes given a set of specific inputs. The reading technique is not limited to strictly following the exact path— since computers are executing along a specific trace for each and every branch. In scenario reading code inspections where branches are simplistic both branches can be considered at the same time (as is done in traditional reading for code inspections). Scenario reading follows along an outline for the general execution flow for code. In some literature scenario code inspections use scenario as a description of the reader/reviewer roles where one reader may take a user perspective and another reader the perspective of say an interfacing system. The use of the term "scenario" in scenario reading techniques used here is similar to scenarios as defined in requirements/testing environments—code execution path analysis.

Marking lines inspected requires the new software tool to permit an interactive relationship between the code reviewer and the source code being displayed such that the reviewer, through mouse and keyboard commands, can indicate to the tool which source lines have been inspected. The tool responds with positive visual indications that the tool has marked the lines inspected and persistently maintains that inspection information across scenario sessions. Each reviewer has their own unique indications of what source code has been inspected without interference from different reviewers' inspection indications. Additionally, the tool provides the capability to mark lines inspected and to support usage of the tool in both preparation for inspection by each individual reviewer and during inspection meetings for the group as a whole.

To determine if all lines to be inspected have been inspected requires the tool to track and coordinate two items: the lines to be inspected and the lines marked as inspected. The tool then provides visual feedback to the reviewer as to what code locations have not yet been inspected.

To support reviewing selected unchanged (or referential) code along with changed code requires the tool to allow inclusion of reviewer-selected source files along with any files selected due to changed code.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings wherein the showings are for purposes of illustrating the exemplary embodiments only and not for purposes of limiting the claimed subject matter, FIG. 1 shows one example of a system 10 that may be used to run the code inspection tool software. The system 10 may include an input device 12 (e.g., a keyboard and/or mouse) in communication with a display device 14 (e.g., a monitor). The display device is in communication with a user processing device 16 (e.g., a CPU). Note also that the software implemented aspects of the invention are typically encoded on some form of program storage medium 18 such as memory, or implemented over some type of transmission medium 20 such as one or more networks. The program storage medium may be magnetic (e.g., a flash drive or a hard drive) or optical (e.g., a DVD), and may be read only or random access. Similarly, the transmission medium may be twisted wire pairs, coaxial cable, optical fiber, or some other suitable transmission medium known to the art. The invention is not limited by these aspects of any given implementation.

Figure 2:
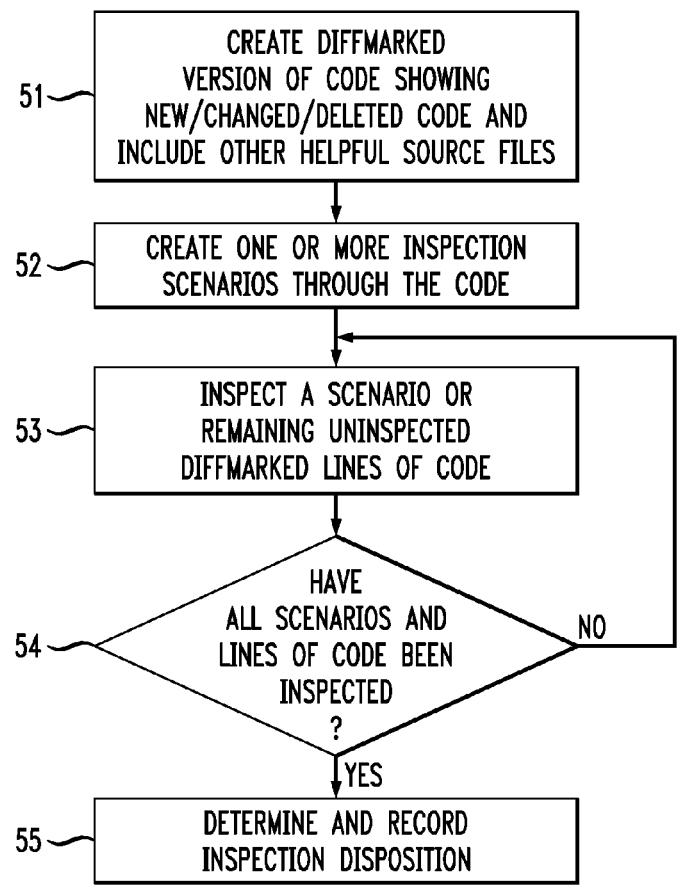
FIG. 2 is a flowchart of an exemplary code inspection method in accordance with aspects of the present invention.

We turn now to FIG. 2, which is a flowchart of an exemplary method of inspecting code using the new software tool. The new software tool may be applied to both new code and to bug fixes. Initially, the author of the code creates a diffmarked version of the source code, showing the new/changed/deleted code and including other helpful source files (51). Diffmarked code refers to a code listing showing the current code and visually indicating differences with some other defined version.

Next, the author creates the scenarios, including outside text possibly with hyperlinks and hyperlinks in the code view (52). That is, the author creates one or more paths through the code providing links from function/macro calls to the function or macro source in the code (supporting easy navigation of the code for a scenario.) Both the additionally included source code (or referential code) and the diffmarked source code can have hyperlinks in them pointing to any of the source from either diffmarked or referential code. The software tool may also support commentary addition. Thus, the author may add commentary in the scenario(s) specifying special considerations (e.g., what the code is modeling in real life or what a segment of the scenario is achieving) or conditions (e.g., data value intended to be used for this scenario at a logic branching statement).

The code is then shared with one or more reviewers. In this regard, the software tool provides a way to follow the scenarios designated by the author. Thus, each reviewer inspects a scenario or remaining uninspected diffmarked lines of code (53). The reviewer follows the next uninspected scenario via provided links, inspecting code in "execution order" or inspecting uninspected diffmarked lines of code. The reviewer annotates the code with any errors/observations found and marks lines inspected using the software tool.

Figure 3:
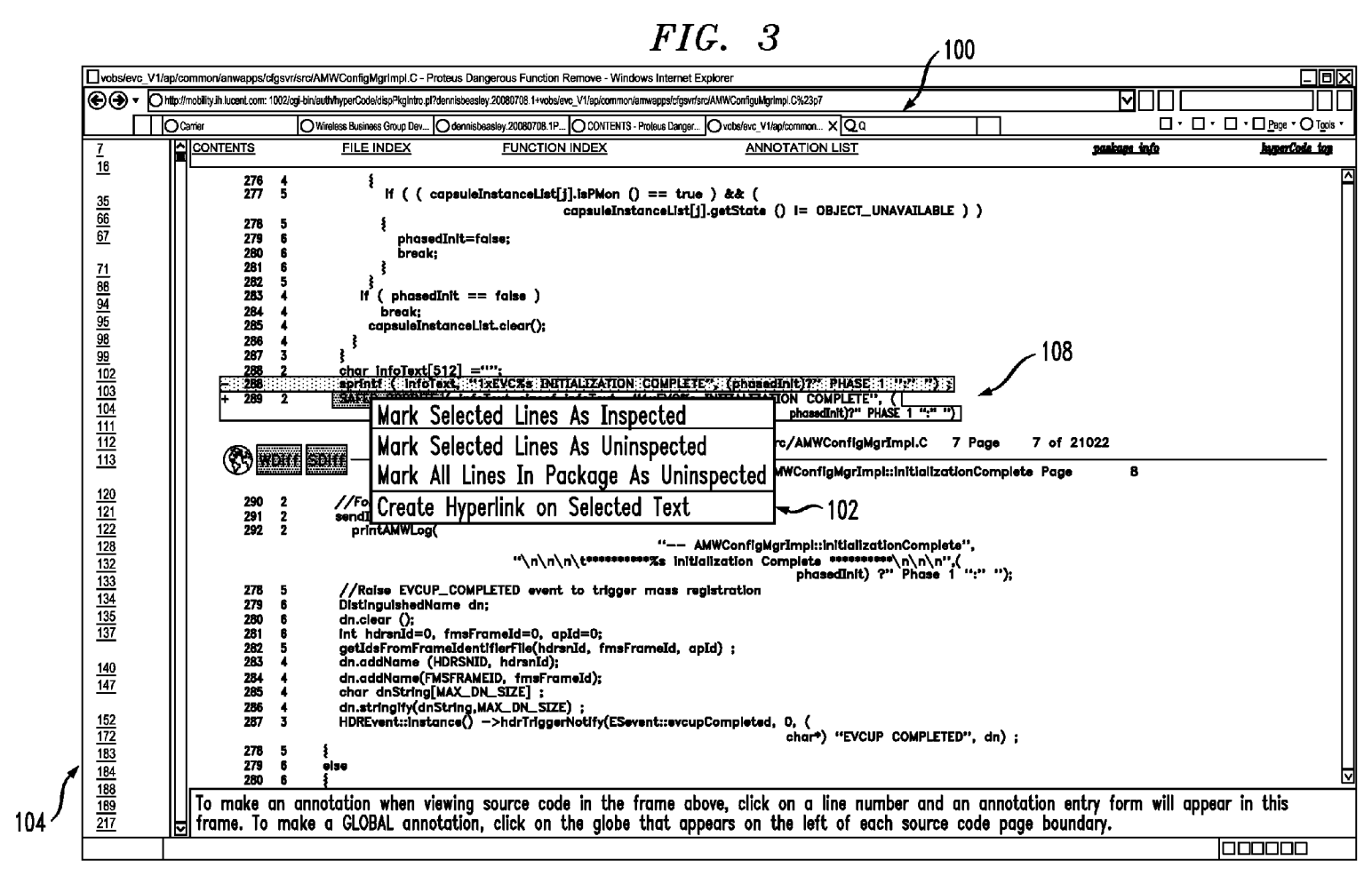

To assist the reviewer, the software tool provides a context menu that may be used to make such notations on selected lines. Referring now to FIG. 3, one example of a source code page 100 with such a context menu 102 is illustrated. Typically, on any page with a page specific context menu, holding down the ctrl key while using the right mouse button (or context menu key) will cause the browser's standard right mouse menu (context menu) to appear. In this example, the reviewer may be given several choices, including, but not limited to: "Mark Selected Lines As Inspected," "Mark Selected Lines As Uninspected," "Mark All Lines In Package As Uninspected," and "Create Hyperlink on Selected Text." The selected text, in inverse video highlighting, can be seen partially covered by the context menu. The left hand column 104 contains links to pages containing changed code, the link text is the page number.

View frames as mentioned in the implementation of the invention are HTML frames. The software tool may include a Page List frame on the left consisting of the page numbers for pages in the inspection package that contain differences between the version to be inspected and some other defined version. A '*' decoration may be used to indicate all changes to be inspected have been inspected. The code view frame is the large frame that contains the diffmarked code, with possibly hyperlinks between code pages, annotation markers, and markings for lines inspected. The bottom frame is used for creating/updating/deleting annotations (comments about the code) and for creating/editing/deleting hyperlinks between code pages.

With continued reference to FIG. 3, on the source code page 100 a reviewer can select a line or a range of lines (106) to be marked inspected or not inspected. Generally, only added or modified lines with line numbers are actually markable. For instance, the reviewer may select lines with a mousedown—drag—mouseup action then use the right mouse button (or context menu key) to bring up a menu that will allow the selected lines to be marked inspected or uninspected. There is also a context menu item to mark all lines in a package as uninspected. Marking is persistent but only per reviewer. Other reviewers do not see the reviewer's inspection markings. The marking of the reviewed code is also persistent for a meeting review. Lines are marked by "highlighting" the line numbers. For each page in the page list frame, when all added/changed lines on a page are marked inspected, an asterisk '*' (or other mark) may appear after the page number. If there are only deleted lines on a page, it may be marked with an asterisk from the start.

It is to be understood, however, that there are other ways of selecting those lines, such as by clicking on the first and last line and making a selection out of a pop-up menu. Moreover, the handling of the deleted lines can either be "ignored" or "counted" as needing to be reviewed.

Figure 4:
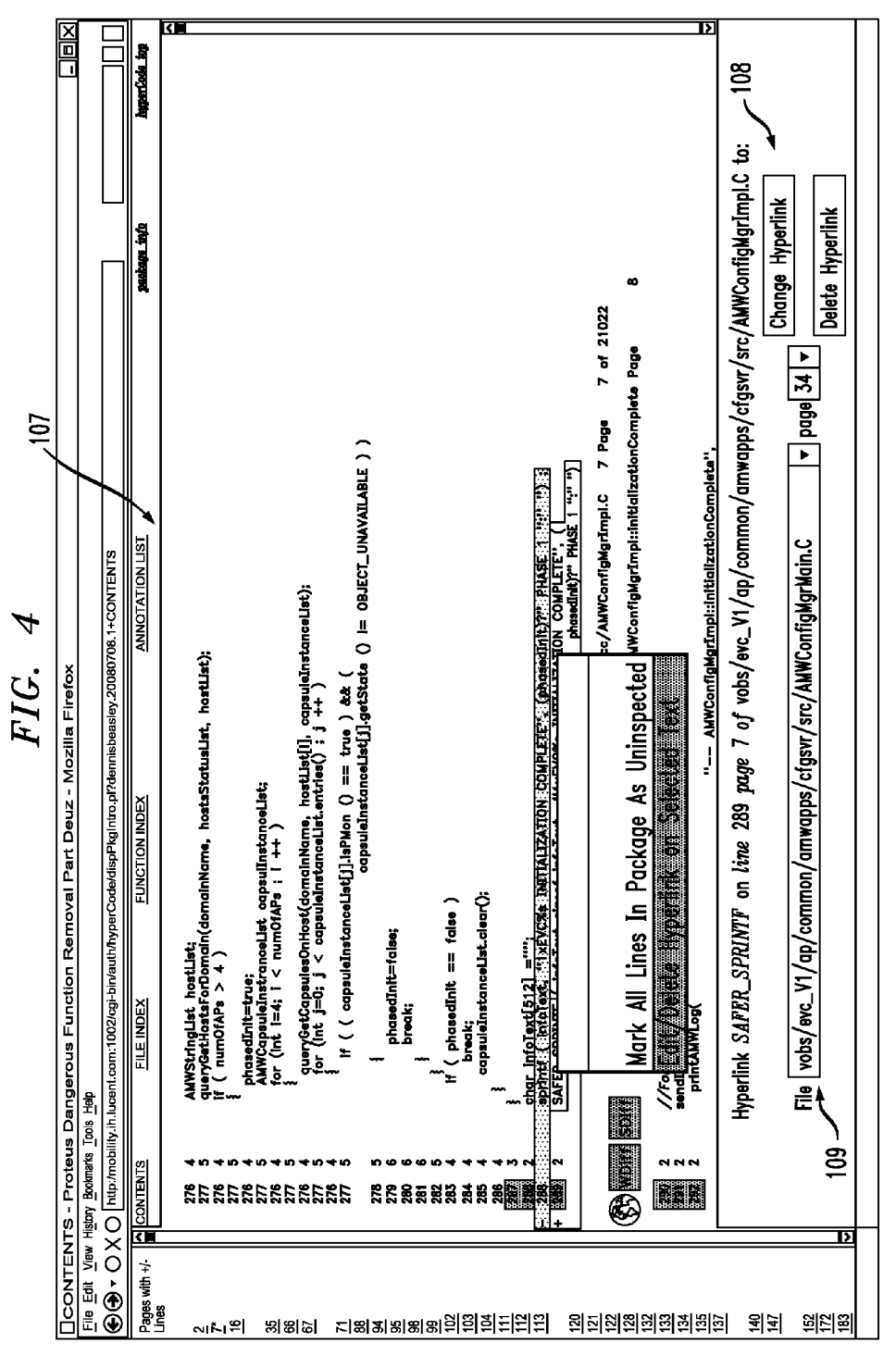

On the source code page 100, a reviewer can add hyperlinks from one code page in the inspection package to another code page in the inspection package. Another source code page 107 is shown in FIG. 4. The context menu for the edit/delete hyperlink entry is shown. In the bottom frame 108 is the edit/delete hyperlink form 109. Thus, the reviewer may select text (like a function name) in a code page and use the context (right mouse) menu entry to create/edit/delete a hyperlink. The form may appear in the bottom frame that can be used to specify the code page for the link target. Submitting the form will cause the code frame to be updated with the hyperlink. To edit or delete a hyperlink: right click the link, and select the edit/delete hyperlink context menu entry.

Unlike inspection markings, hyperlinks created by one reviewer are visible by all reviewers. Character sequences to be hyperlinked generally only contain the following characters [a-zA-Z0-9_]. Thus, words connected by a space character cannot be hyperlinked as one link. Also all matching character sequences on a line may be hyperlinked. Thus, if a function is hyperlinked on a line and used twice on the same line, two hyperlinks will be created.

Figure 5:
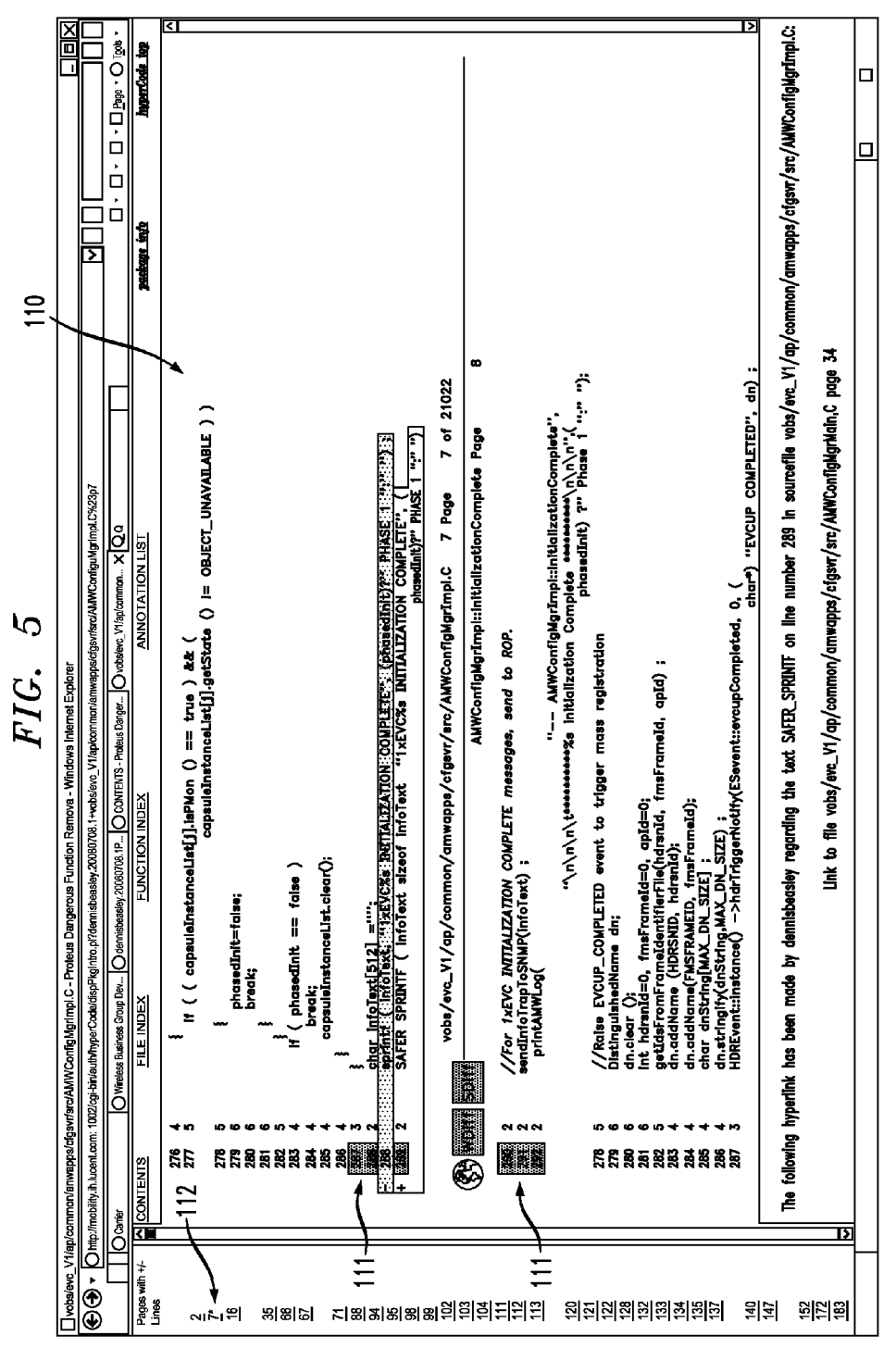

FIG. 5 is a screen shot showing another source code page 110, where some lines have been marked inspected. There is reverse highlighting on the line numbers (111), and notice that in the left pane there is a * on page number 7 (112) that indicates that all added/changed lines on page 7 have been marked inspected.

Returning now to the flowchart of FIG. 2, a determination is made as to whether all scenarios and lines of code have been inspected (54). If not, then the reviewer inspects another scenario or the remaining uninspected diffmarked lines of code (53). Otherwise, the inspection disposition is recorded (55).

Figure 6:
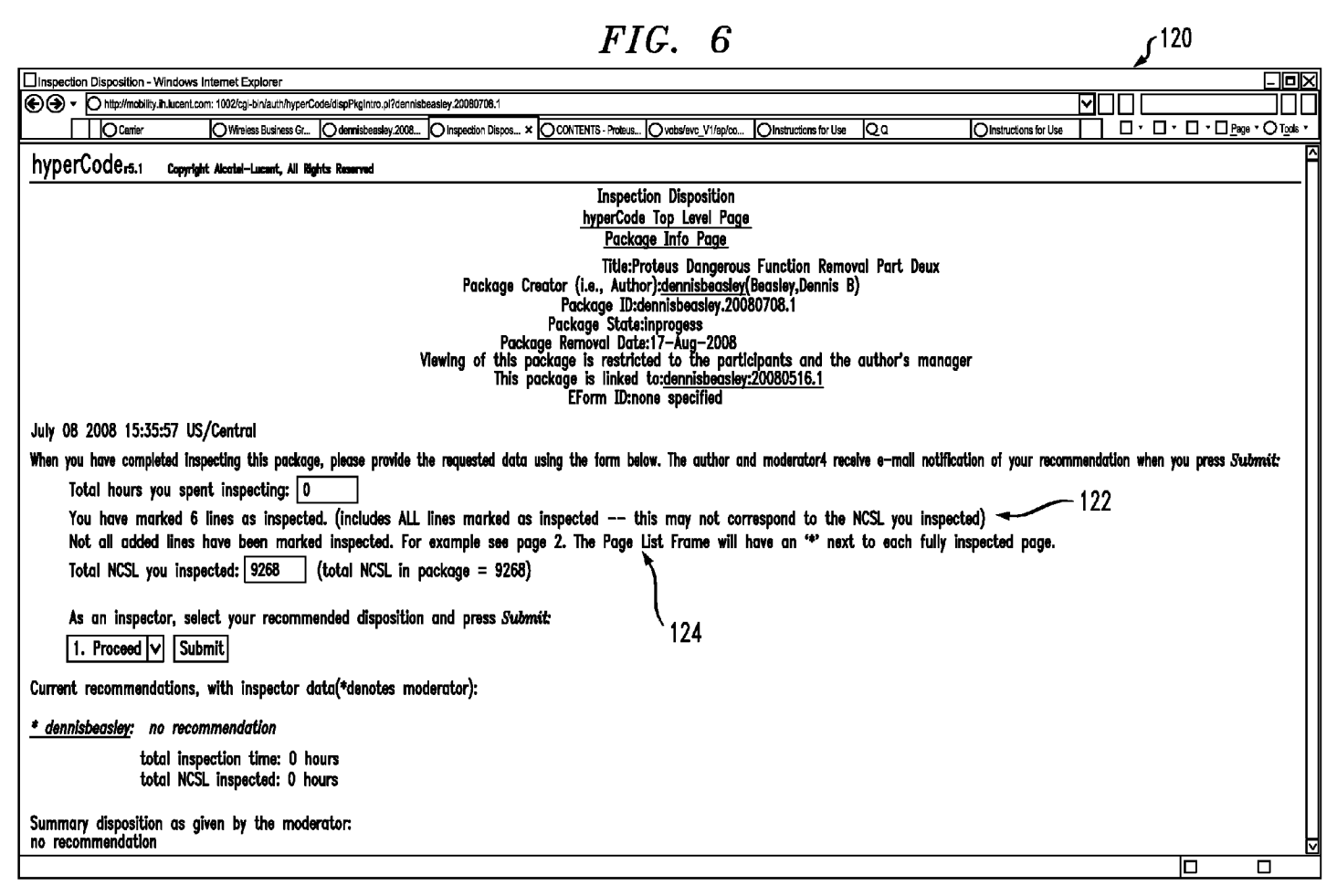

FIG. 6 is a screen shot of one example of an Inspection Disposition page (120). Note that there is an indication (122) of how many lines have been marked inspected (in this example, 6 lines have been marked inspected). There is another indication (124) regarding uninspected lines (in this example, the first page with unmarked lines is page 2). In order to assist the reader, the software tool has to keep track of which lines have and have not been marked inspected to know when all have been inspected.

The software tool may also support inspection meetings. That is, there may be a function in the software tool to support marking lines inspected during the meeting itself, after individuals have marked the code for their preparation. For example, this may be accomplished by the "recorder" removing any existing inspection markings and starting over. Otherwise, the same review process described above may be used. The gathered reviewers inspect a scenario or uninspected diffmarked lines of code. The reviewers follow the scenario execution path via navigation links through the code, reviewing annotations and collecting any new annotations raised during the meeting. Someone at the meeting uses the tool to mark the inspected lines. Upon completion of the meeting, the moderator determines and records the inspection disposition.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A computer program product for scenario-based source code inspection, the computer program product comprising:
one or more non-transitory machine readable media storing instructions that, when executed by a computer, cause the computer to display a plurality of functions, the plurality of functions comprising:
a first function for creating one or more scenario paths, wherein the one or more scenario paths include at least one execution order in the source code, the first function including the ability to create hyperlinks from calls to a subroutine or macro source in the code and commentary addition; and
a second function for inspecting code in execution order of the one or more scenario paths and inspecting uninspected lines of code including the ability to annotate the code with any errors and observations found and mark lines inspected wherein the plurality of functions further comprise:
a third function for providing a Page List frame consisting of the page numbers for pages in an inspection package that contain differences between the source code to be inspected and a reference version.

2. The computer program product of claim 1, wherein the source code comprises new code or bug fixes.

3. The computer program product of claim 1, wherein the one or more scenario paths specify a set of inputs.

4. The computer program product of claim 3, wherein the second function presents the source code in execution order of the one or more scenario paths.

5. The computer program product of claim 1, wherein the plurality of functions further comprises:
a fourth function for providing a code view frame that contains diffmarked code with hyperlinks between code pages, annotation markers, and markings for lines inspected and a bottom frame for creating, updating, and deleting comments about the code and for creating, editing, and deleting hyperlinks between code pages.

6. The computer program product of claim 1, wherein all hyperlinks, inspection markings, and annotations are persistent, all hyperlinks and annotations are seen by everyone, and all inspection markings are per reviewer.

7. A system for scenario-based source code inspection, the system comprising:
an input device;
a display device in communication with the input device;
a user processing device in communication with the display device; and
a program storage medium for storing the source code and a source code inspection tool, wherein the source code and the source code inspection tool are displayed on the display device and the software inspection tool comprises a plurality of functions including:
a first function for creating one or more scenario paths, wherein the one or more scenario paths include an execution order in the source code, the first function including the ability to create hyperlinks from calls to a subroutine or macro source in the code and commentary addition; and
a second function for inspecting code in execution order and inspecting uninspected lines of code including the ability to annotate the code with any errors and observations found and mark lines inspected wherein the plurality of functions further comprise:
a third function for providing a Page List frame consisting of the page numbers for pages in an inspection package that contain differences between the source code to be inspected and a reference version.

8. The system of claim 7, wherein the source code comprises new code or bug fixes.

9. The system of claim 7, wherein the first function further comprises the ability to add commentary in the scenario paths specifying special considerations special conditions.

10. The system of claim 9, wherein the special considerations comprise what the code is modeling in real life or what a segment of the scenario is achieving and the special conditions comprise a data value intended to be used for the scenario at a logic branching statement.

11. The system of claim 7, wherein the plurality of functions further comprises:
a fourth function for providing a code view frame that contains diffmarked code with hyperlinks between code pages, annotation markers, and markings for lines inspected and a bottom frame for creating, updating, and deleting comments about the code and for creating, editing, and deleting hyperlinks between code pages.

12. The system of claim 7, wherein all hyperlinks, inspection markings, and annotations are persistent, all hyperlinks and annotations are seen by everyone, and all inspection markings are per reviewer.

13. A method comprising:
creating one or more scenarios in source code that are to be inspected by one or more reviewers;
reviewing each of the scenarios by reading text and following the hyperlinks;
marking lines of source code inspected with a software tool;
determining whether all lines of code to be inspected have been inspected; and
recording an inspection disposition when all lines of code to be inspected have been inspected wherein the software tool further comprises:
a third function for providing a Page List frame consisting of the page numbers for pages in an inspection package that contain differences between the source code to be inspected and a reference version.

14. The method of claim 13, wherein the source code comprises new code or bug fixes.

15. The method of claim 13, wherein the software tool further comprises a first function for creating one or more scenario paths, wherein the one or more scenario paths includes at least one execution order in the source code, the first function including the ability to create hyperlinks from calls to a subroutine or macro source in the code and commentary addition, and a second function for inspecting code in the at least one execution order and inspecting uninspected lines of code by providing the ability to annotate the code with any errors and observations found and mark lines inspected.

16. The method of claim 13, wherein the software tool further comprises:
a fourth function for providing a code view frame that contains diffmarked code with hyperlinks between code pages, annotation markers, and markings for lines inspected and a bottom frame for creating, updating, and deleting comments about the code and for creating, editing, and deleting hyperlinks between code pages.

17. The method of claim 13, wherein all hyperlinks, inspection markings, and annotations are persistent, all hyperlinks and annotations are seen by everyone, and all inspection markings are per reviewer.

* * * * *